(12) United States Patent
Hashiguchi et al.

(10) Patent No.: US 12,428,188 B2
(45) Date of Patent: Sep. 30, 2025

(54) MANAGEMENT SYSTEM

(71) Applicant: ISHIDA CO., LTD., Kyoto (JP)

(72) Inventors: Nobuki Hashiguchi, Ritto (JP); Tsuyoshi Ishibashi, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 530 days.

(21) Appl. No.: 17/906,287

(22) PCT Filed: Jan. 29, 2021

(86) PCT No.: PCT/JP2021/003428
§ 371 (c)(1),
(2) Date: Sep. 14, 2022

(87) PCT Pub. No.: WO2021/186915
PCT Pub. Date: Sep. 23, 2021

(65) Prior Publication Data
US 2023/0101971 A1    Mar. 30, 2023

(30) Foreign Application Priority Data

Mar. 18, 2020 (JP) .................. 2020-047780

(51) Int. Cl.
*B65B 57/10* (2006.01)
*A47J 36/32* (2006.01)
(Continued)

(52) U.S. Cl.
CPC ............ *B65B 57/10* (2013.01); *A47J 36/32* (2013.01); *B65B 1/32* (2013.01); *G01G 19/393* (2013.01);
(Continued)

(58) Field of Classification Search
CPC ......... B65B 57/10; B65B 1/32; B65B 57/145; B65B 1/34; B65B 57/00; A47J 36/32;
(Continued)

(56) References Cited

U.S. PATENT DOCUMENTS 5,479,756 A * 1/1996 Haze ..................... B65B 57/00
53/502
6,553,331 B2 * 4/2003 Sakagami .............. G01G 15/00
702/175
(Continued)

FOREIGN PATENT DOCUMENTS

EP    1282021 A1    2/2003
EP    1927912 A1    6/2008
(Continued)

OTHER PUBLICATIONS

Takita, K., English Translation of JP 2006185087 A, published Jul. 13, 2006.*
(Continued)

*Primary Examiner* — Xuemei G Chen
(74) *Attorney, Agent, or Firm* — Studebaker Brackett PLLC

(57) ABSTRACT

A management system (1) manages a production line (2) including a processing apparatus (20) and an inspection apparatus (40). The management system (1) includes: a control unit (61) that estimates a processing time at which a defective food is processed by the processing apparatus (20) based on a time at which the defective food determined as a defective product by inspection by the inspection apparatus (40) is inspected; and a storage unit (62) that stores processing information of the processing apparatus (20) related to the processing time estimated by the control unit (61) such that the processing information can be output.

4 Claims, 3 Drawing Sheets

(51) Int. Cl.
*B65B 1/32* (2006.01)
*G01G 19/393* (2006.01)
*G06T 7/00* (2017.01)
*H04N 7/18* (2006.01)

(52) U.S. Cl.
CPC .......... *G06T 7/0004* (2013.01); *H04N 7/181* (2013.01); *G06T 2207/30128* (2013.01)

(58) Field of Classification Search
CPC ................ G01G 19/393; G06T 7/0004; G06T 2207/30128; H04N 7/181; G05B 2219/37208; G05B 2219/37212; G05B 2219/45048; G05B 19/41875; G05B 19/418; Y02P 90/02; G01N 21/8851; G01N 2021/8411
See application file for complete search history.

(56) References Cited

U.S. PATENT DOCUMENTS

| | | | | |
|---|---|---|---|---|
| 2003/0000179 | A1* | 1/2003 | Nakagawa | B65B 57/14 53/493 |
| 2005/0277532 | A1* | 12/2005 | Iwasa | G01N 21/89 493/12 |
| 2007/0019841 | A1* | 1/2007 | Hirose | G01N 23/04 382/110 |
| 2010/0202694 | A1* | 8/2010 | Kabumoto | G01N 21/3581 378/57 |
| 2017/0225200 | A1* | 8/2017 | Makino | G01N 23/04 |
| 2018/0242440 | A1* | 8/2018 | Kabumoto | G01N 23/043 |
| 2018/0349780 | A1 | 12/2018 | Xiu et al. | |
| 2020/0041423 | A1* | 2/2020 | Sugimoto | G01N 23/04 |
| 2020/0077050 | A1* | 3/2020 | Sato | G06V 20/52 |
| 2020/0380656 | A1* | 12/2020 | Wendel | G06T 7/001 |

FOREIGN PATENT DOCUMENTS

| | | |
|---|---|---|
| EP | 1 600 763 B1 | 9/2015 |
| JP | 2004-331107 A | 11/2004 |
| JP | 2006-185087 A | 7/2006 |
| JP | 2008-293142 A | 12/2008 |
| JP | 2019-190856 A | 10/2019 |
| WO | 2019/203030 A1 | 10/2019 |

OTHER PUBLICATIONS

International Search Report issued in PCT/JP2021/003428; mailed Apr. 6, 2021.

The extended European search report issued by the European Patent Office on Feb. 14, 2024, which corresponds to European Patent Application No. 21771120.9-1205 and is related to U.S. Appl. No. 17/906,287.

An Office Action; mailed by the China National Intellectual Property Administration of the People's Republic of China on Dec. 18, 2024, which corresponds to Chinese Patent Application No. 202180021822.6 and is related to U.S. Appl. No. 17/906,287.

Communication pursuant to Article 94(3) EPC issued by the European Patent Office on Aug. 7, 2025, which corresponds to European Patent Application No. 21771120.9-1201 and is related to U.S. Appl. No. 17/906,287.

* cited by examiner

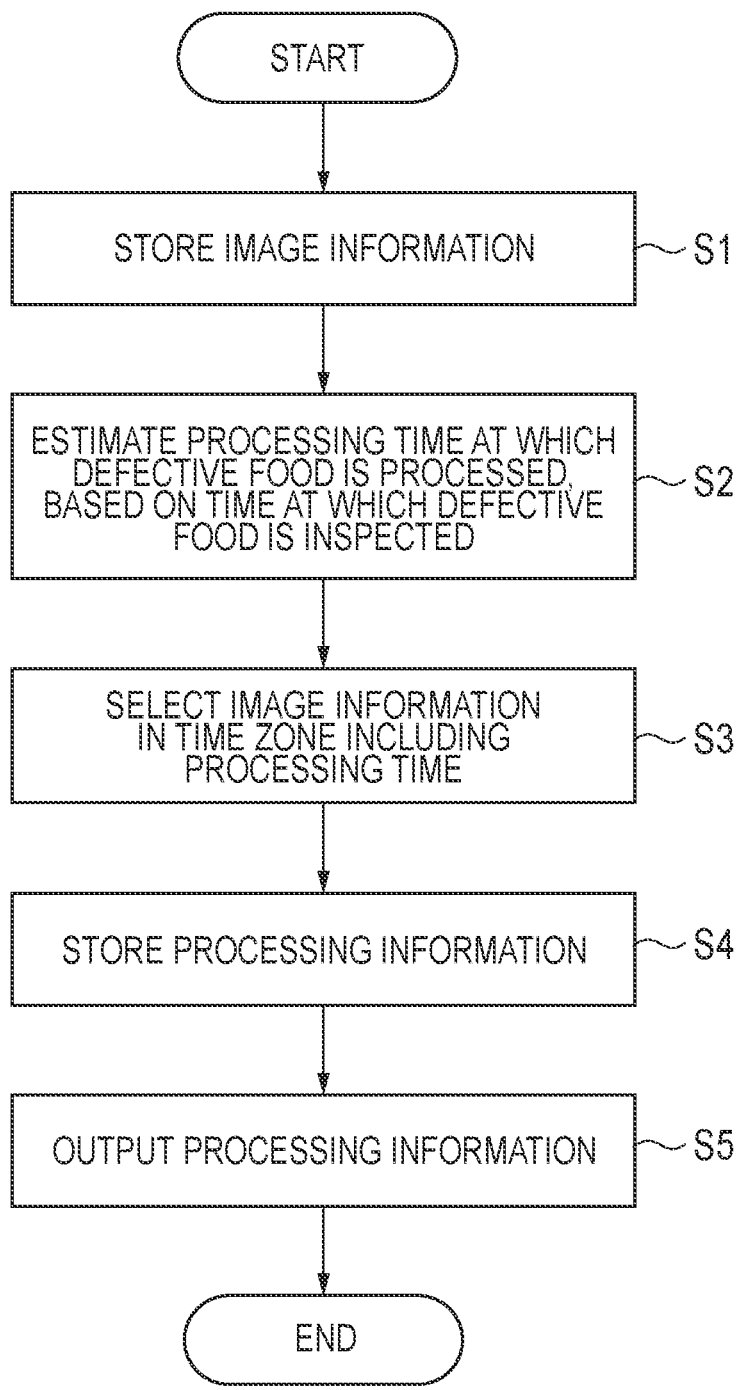

MANAGEMENT SYSTEM

CROSS-REFERENCE TO RELATED APPLICATIONS

The present application is a U.S. National phase of International Patent Application No. PCT/JP2021/003428, filed on Jan. 29, 2021, which claims the benefit of Japanese patent application No. 2020-047780 filed on Mar. 18, 2020. The entire contents of which are hereby incorporated by reference.

TECHNICAL FIELD

The present invention relates to a management system.

BACKGROUND ART

Conventionally, a management system that manages a production line including a processing apparatus that processes food and an inspection apparatus that inspects whether the food processed by the processing apparatus is a defective product has been widely known (see, for example, Patent Literature 1). When the inspection apparatus determines that the food is a defective product, the food is separated from non-defective foods and discarded. As a result, it is possible to ship only the food not including a defective food.

CITATION LIST

Patent Literature

Patent Literature 1: JP 2019-190856 A

SUMMARY OF INVENTION

Technical Problem

When a defective product is produced as described above, it is desired to identify the cause of the production in order to reduce the production of a defective product again. By identifying the cause of the production, an operator can easily take measures for improvement.

However, even if an inspection apparatus finds that the food processed by a processing apparatus is a defective product, the entire system becomes complex, and it is difficult for the operator to identify the cause of the production of the defective food caused by processing of the processing apparatus.

Therefore, an object of the present invention is to provide a management system that manages a production line including a processing apparatus that processes food and an inspection apparatus that inspects whether or not the food processed by the processing apparatus is a defective product, in which it is easy to identify the cause of the production of a defective food caused by processing of the processing apparatus.

Solution to Problem

A management system according to an aspect manages a production line including a processing apparatus that processes food and an inspection apparatus that inspects whether the food processed by the processing apparatus is a defective product. The management system includes: a control unit that estimates a processing time at which a defective food is processed by the processing apparatus based on a time at which the defective food determined as a defective product by inspection by the inspection apparatus is inspected; and a storage unit that stores processing information of the processing apparatus related to the processing time estimated by the control unit such that the processing information can be output.

Advantageous Effects of Invention

According to the present invention, it is possible to provide a management system that manages a production line including a processing apparatus that processes food and an inspection apparatus that inspects whether or not the food processed by the processing apparatus is a defective product, in which it is easy to identify the cause of the production of a defective food caused by processing of the processing apparatus.

BRIEF DESCRIPTION OF DRAWINGS

FIG. 3 is a diagram illustrating an example of an operation of a management apparatus.

DESCRIPTION OF EMBODIMENTS

Figure 1:
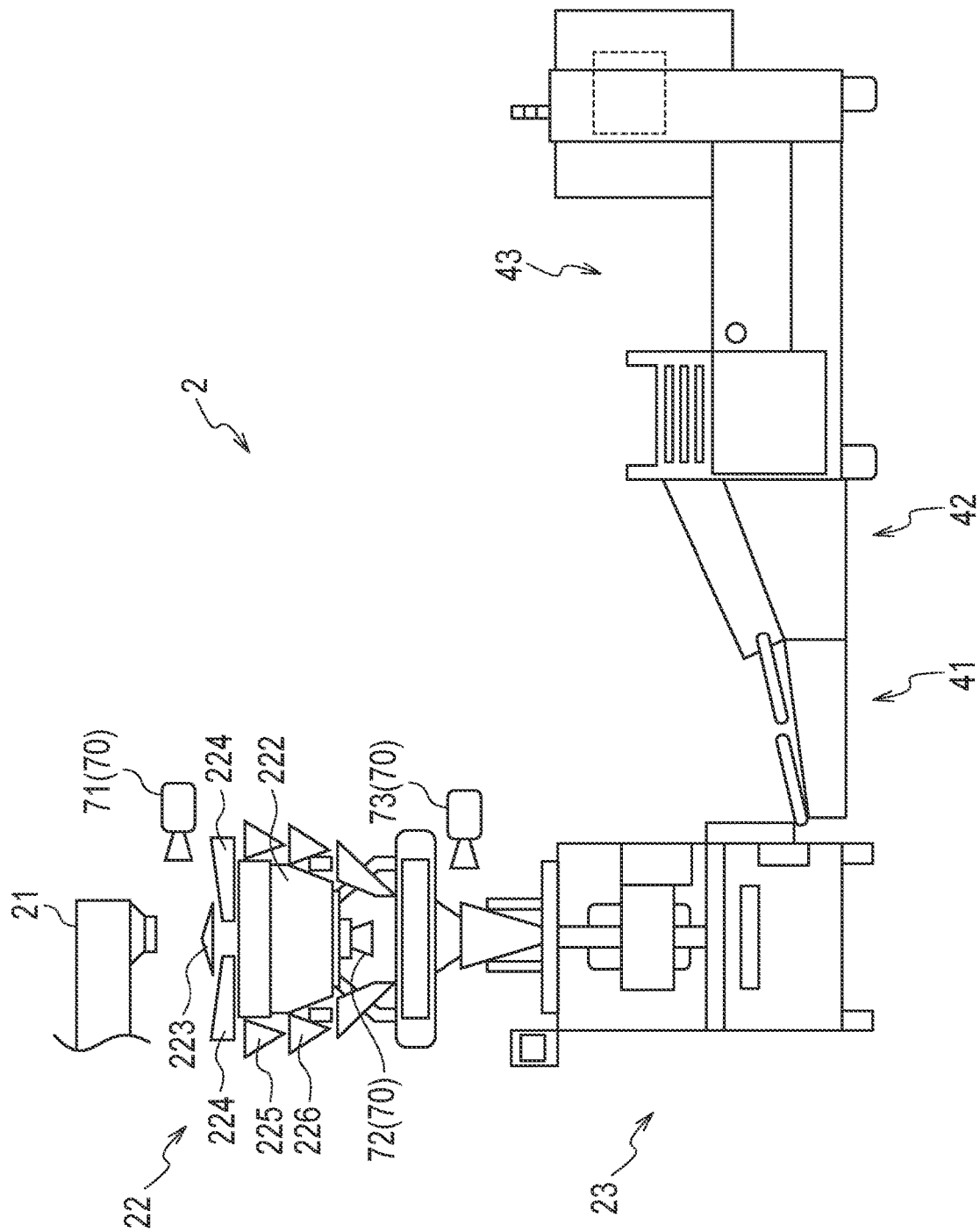
FIG. 1 is a conceptual diagram of a production line according to an embodiment.

An article conveyance apparatus according to an embodiment will be described with reference to the drawings. In the following description of the drawings, the same or similar parts are denoted by the same or similar reference signs. The dimensional ratios in the drawings do not necessarily match those in the description. The embodiment described below is one specific example of the present invention, and does not limit the technical scope of the present invention.

(1) Configuration of Management System

A management system 1 manages a production line 2. In the production line 2, for example, industrially mass-produced foods such as snacks and candies are divided according to predetermined weight or number, bagged, and sent to a downstream process. In the downstream process of the production line 2, the quality of the bagged article is inspected. In the downstream process, a defective product may be removed, and only a non-defective product may be packed and shipped.

Figure 2:
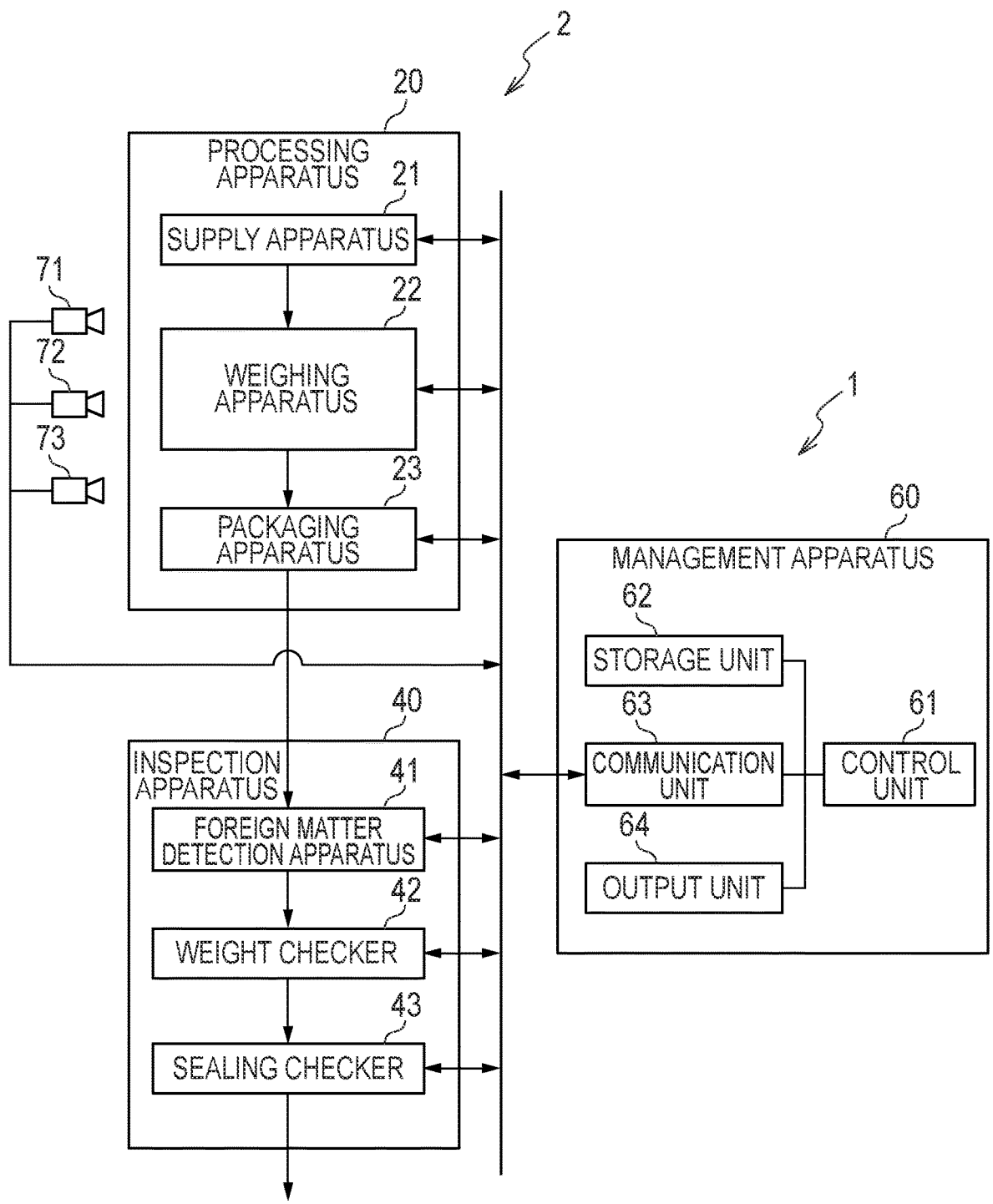
FIG. 2 is a block configuration diagram of a management system according to the embodiment.

FIG. 1 is a conceptual diagram of the production line 2 according to the embodiment. FIG. 2 is a block configuration diagram of the management system 1. The production line 2 is managed by the management system 1 (management apparatus 60). The production line 2 includes a processing apparatus 20 that processes food, an inspection apparatus 40 that inspects whether the food processed by the processing apparatus 20 is a defective product, and a camera 70 that captures an image of a processing status in which the food is processed by the processing apparatus 20. The processing apparatus 20 may perform a plurality of processes on the food. The processing apparatus 20 may perform first processing and perform second processing after the first processing, for example. The processing apparatus 20 includes a supply apparatus 21, a weighing apparatus 22 and a packaging apparatus 23.

The supply apparatus 21 supplies the produced food to the weighing apparatus 22. Specifically, the supply apparatus 21 drops the food from above the weighing apparatus 22 to supply the food to the weighing apparatus 22. For example, when the article is potato chips, the supply apparatus 21 may include a flyer for frying the ingredients and a seasoning apparatus for seasoning the article.

The weighing apparatus 22 divides the article supplied from the supply apparatus 21 according to predetermined weight or number, and supplies the article to the packaging apparatus 23. The weighing apparatus 22 includes an umbrella-shaped dispersion table 223 whose central portion is supported by a vibrator 222, a plurality of vibration feeders 224 arranged around the dispersion table 223, pool hoppers 225 arranged below each of the vibration feeders 224, and weighing hoppers 226 arranged below each of the pool hoppers 225.

The food supplied from the supply apparatus 21 is placed on the upper surface of the dispersion table 223. When the dispersion table 223 is vibrated by driving of the vibrator 222, the food is radially dispersed on the upper surface of the dispersion table 223. The dispersed food is placed on the vibration feeders 224, then falls due to vibration of the vibration feeders 224, and is temporarily stored in the pool hoppers 225. The food in the pool hoppers 225 is put into the weighing hoppers 226. The weighing hoppers 226 measure the weight of the input food. The weighing apparatus 22 selects and combines the measured values of the weight of the food by the plurality of weighing hoppers 226 such that the weight of the food to be supplied to the packaging apparatus 23 is a predetermined value. Then, the food in the weighing hoppers 226 indicating the selected measured values is discharged, merged, and supplied to the packaging apparatus 23.

The packaging apparatus 23 bags the food divided by the weighing apparatus 22 according to predetermined weight or number using a packaging material, and sends the food to the inspection apparatus 40. The packaging apparatus 23 forms a thermoplastic film, which is a packaging material, into a cylindrical shape, and fills the film with the article and seals the film.

The inspection apparatus 40 inspects the quality of the article (food) packaged by the packaging apparatus 23. As illustrated in FIG. 2, the inspection apparatus 40 includes a foreign matter detection apparatus 41, a weight checker 42, and a sealing checker 43. The inspection apparatus 40 uses each of these apparatus to determine whether the article sent from the packaging apparatus 23 is a non-defective product or a defective product.

The foreign matter detection apparatus 41 detects whether or not foreign matter such as a metal piece is mixed in the article packaged by the packaging apparatus 23. The foreign matter detection apparatus 41 is, for example, a metal detector capable of detecting metal foreign matter or an X-ray foreign matter detector capable of detecting not only metal but also non-metal foreign matter. The foreign matter detection apparatus 41 determines that an article in which foreign matter is detected is a defective product.

The weight checker 42 measures the weight of the article packaged by the packaging apparatus 23 and determines whether the measured value of the weight is within a predetermined range. The weight checker 42 determines an article whose weight is not within the predetermined range as a defective product.

The sealing checker 43 detects a sealing failure of a bag filled with the article packaged by the packaging apparatus 23. The sealing checker 43 determines the article packaged in the bag in which the sealing failure is detected as a defective product.

The production line 2 may include a distributing apparatus (not illustrated), a boxing apparatus (not illustrated), and a case checker (not illustrated). The distributing apparatus removes an article determined to be defective by the inspection apparatus 40 from the production line 2 and sends the article to the boxing apparatus. Specifically, the distributing apparatus removes, from the production line 2, a defective product in which foreign matter is detected by the foreign matter detection apparatus 41, a defective product in which the weight is determined not to be within the predetermined range by the weight checker 42, and a defective product in which the sealing failure is detected by the sealing checker 43, and sends only a non-defective product to the boxing apparatus. The boxing apparatus packs a predetermined number of articles sent from the distributing apparatus into a box and seals the box. The boxing apparatus may have a mechanism for assembling the box. The case checker measures the weight of the box sealed by the boxing apparatus, and determines whether the measured value of the weight is within a predetermined range. The case checker removes a box whose weight is not within the predetermined range from the production line 2.

(2) Configuration of Management Apparatus 60

The management apparatus 60 manages the production line 2. The management apparatus 60 is a personal computer connected to each of the apparatus constituting the production line 2 via a communication line. The management apparatus 60 includes a control unit 61, a storage unit 62, a communication unit 63, and an output unit 64.

The control unit 61 is an arithmetic apparatus such as a CPU. The control unit 61 controls the storage unit 62, the communication unit 63, and the output unit 64. For example, the control unit 61 reads and executes a program stored in the storage unit 62, processes data received by the communication unit 63 from each of the apparatus constituting the production line 2, and displays a result of the processing on the output unit 64. In the present embodiment, the control unit 61 may include a program for performing arithmetic processing on input data and outputting an arithmetic result, and a program for acquiring data used for the arithmetic processing.

The storage unit 62 is a main storage unit apparatus such as a RAM, and an auxiliary storage unit apparatus such as an HDD or a USB memory. The storage unit 62 stores a program to be executed by the control unit 61, data to be transmitted and received by the communication unit 63, and the like.

The communication unit 63 is a network interface apparatus having a connection terminal for the communication line, such as a LAN card or a modem. The communication unit 63 is connected, via the communication line, to each of the weighing apparatus 22, the packaging apparatus 23, and the inspection apparatus 40 constituting the production line 2. The communication unit 63 may be connected to each of the distributing apparatus, the boxing apparatus, and the case checker via the communication line. The communication line is a LAN cable, an Internet line, or the like. The communication unit 63 receives data transmitted from each of the apparatus constituting the production line 2 and transmits a command from the control unit 61 to each of the apparatus. The communication unit 63 can acquire meter data, error information, and the like of each of the apparatus in real time by receiving data from each of the apparatus constituting the production line 2, for example, every several seconds.

The output unit 64 is a apparatus that outputs data, such as a monitor or a printer. In the present embodiment, the output unit 64 is a display apparatus having a screen. The output unit 64 outputs data processed by the control unit 61, data stored in the storage unit 62, data transmitted and received by the communication unit 63 from each of the apparatus constituting the production line 2, and the like.

The camera 70 captures an image of a processing status in which the food is processed by the processing apparatus 20. Image information indicating the processing status captured by the camera is transmitted to the management apparatus 60 via the communication unit 63 and stored in the storage unit 62. The image information may be a still image or a moving image. The image information may be compressed and stored in the storage unit 62 in a predetermined format. For example, the image information may be compressed by Motion JPEG. The image information may be sent to the management apparatus 60 together with image time information indicating the date and time of the image capturing.

The camera 70 may include a plurality of cameras. In the embodiment, the camera 70 includes a first camera 71, a second camera 72, and a third camera 73. The first camera 71 captures an image of food processing status in the first processing. In the embodiment, the first camera 71 captures an image of first conveyance processing status of the food. Specifically, the first conveyance processing status is at least one of the status in which the food is conveyed from the supply apparatus 21 to the weighing apparatus 22 (dispersion table 223), the status in which the food is conveyed from the dispersion table 223 to the vibration feeders 224, and the status in which the food is conveyed from the vibration feeders 224 to the pool hoppers 225. The second camera 72 captures an image of the food processing status in the second processing performed after the first processing. The second camera 72 captures an image of second conveyance processing status of the food. Specifically, the second conveyance processing status is the status in which the food is discharged from the weighing apparatus 22. The third camera 73 captures an image of the food processing status in the third processing performed after the second processing. The third camera 73 captures an image of third conveyance processing status of the food. Specifically, the third conveyance processing status is the status in which the food is conveyed from the weighing apparatus 22 to the packaging apparatus 23.

(3) Configuration of Management Apparatus

Next, the operation of the management apparatus 60 will be described with reference to FIG. 3. FIG. 3 is a diagram illustrating an example of the operation of the management apparatus 60 according to the embodiment. Hereinafter, operation of at least one of the control unit 61, the storage unit 62, the communication unit 63, and the output unit 64 will be appropriately described as the operation of the management apparatus 60.

In step S1, the management apparatus 60 stores image information. Specifically, the storage unit 62 of the management apparatus 60 stores the image information transmitted from the camera 70. The camera 70 may transmit the image information to the management apparatus 60 at a predetermined cycle (for example, every few seconds). The storage unit 62 may store the image information together with the image time information. The storage unit 62 may store the image information together with the reception time when the image information is received. The image information may include a plurality of continuous still images or may include a moving image.

In step S2, the management apparatus 60 (control unit 61) estimates a processing time at which a defective food is processed by the processing apparatus 20 is estimated, based on a time at which a defective food is inspected. In the embodiment, the management apparatus 60 (control unit 61) estimates a processing time at which a defective food is processed by the weighing apparatus 22.

The management apparatus 60 estimates the processing time according to the determination of the defective food by the inspection apparatus 40. The inspection apparatus 40 may transmit determination information indicating that the defective food is determined to the management apparatus 60. The determination information may include information indicating a time at which the defective food determined as a defective product by the inspection by the inspection apparatus is inspected. In addition, in a case where individual identification information is assigned to a package in which the food is packaged, the determination information may include the identification information. In response to the reception of the determination information, the management apparatus 60 may estimate the processing time based on the time when the defective food is inspected.

The management apparatus 60 may estimate the processing time based on the food processing speed at which the food is processed per unit time in the production line 2. An operator may input the food processing speed per unit time to the management apparatus 60. In addition, by causing a sample for estimating the processing speed to flow to the production line 2, the management apparatus may estimate the processing speed on the basis of the processing speed at which the sample is processed.

The management apparatus 60 may estimate each processing time corresponding to the plurality of processes based on the time when the inspection is performed. The management apparatus 60 may estimate a first processing time at which the defective food is processed by the first processing and a second processing time at which the defective food is processed by the second processing. In the embodiment, for example, when a defective food is inspected at time t, the management apparatus 60 may estimate the processing time in the first processing as t−x, the processing time in the second processing as t−y, and the processing time in the third processing as t−z. x, y, and z are values satisfying the relationship of x>y>z. The units of x, y, and z are, for example, seconds. x, y, and z may be determined according to the processing speed.

In step S3, the management apparatus 60 (control unit 61) selects image information in a time zone including the processing time from the image information indicating the processing status captured by the camera 70. The time zone may be, for example, several seconds before and after the processing time as a reference. The selected image information may include a plurality of continuous still images in a predetermined time zone, or may include a moving image in a predetermined time zone. The predetermined time zone may be determined according to the processing speed. The predetermined time zone is preferably a long time zone in which images of all the processing status of the food, which has become the defective food, processed by the processing apparatus 20 are captured by each camera 70, but is preferably short from the viewpoint of saving the storage unit capacity. Therefore, it is preferable that the period during which the food that has become the defective food is present outside the photographing screen of the camera is not included as much as possible.

The management apparatus 60 may select image information in a predetermined time zone from among pieces of image information captured in each of the plurality of processes for each of the plurality of processes. Specifically, the management apparatus 60 may select image information in a first time zone including the first processing time from image information indicating the processing status captured by the first camera 71, select image information in a second time zone including the second processing time from image information indicating the processing status captured by the second camera 72, and select image information in a third time zone including a third processing time from image information indicating the processing status captured by the third camera 73. In addition, the time zones may be changed according to a plurality of processes. For example, the time zone of the processing time in the first processing in which the conveyance speed of the food is low may be longer than the time zones of the processing times in the second processing and the third processing in which the conveyance speed of the food is higher than that in the first processing.

In step S4, the management apparatus 60 (storage unit 62) stores processing information. Specifically, the storage unit 62 stores processing information of the processing apparatus 20 related to the processing time estimated by the control unit 61 such that the processing information can be output. In the present embodiment, the management apparatus 60 (storage unit 62) stores the selected image information as the processing information. In a case where a plurality of processes is performed, the storage unit 62 may store each piece of selected image information as the processing information.

Note that the processing information includes information indicating the estimated processing time. The processing information may include other information. The processing information may include, for example, information indicating at least one of a time (error occurrence time) at which the defective food is inspected, an inspection content (error content), and a line number at which the defective product is produced. Each piece of the image information may be stored with a file name associated with any one of the pieces of information included in the processing information.

In step S5, the management apparatus 60 (output unit 64) outputs the processing information. The management apparatus 60 (control unit 61) may output at least part of the processing information to the output unit 64 according to the storage unit of the processing information. The management apparatus 60 may output the processing information according to the operation of the operator. The management apparatus 60 may display the image information selected as the processing information. In addition, the management apparatus 60 may display the processing time estimated as the processing information. The operator may search for the image information based on the file name. The searched image information may be reproduced by the output unit 64 (for example, the monitor) according to the operator's operation.

As described above, in the present embodiment, the control unit 61 estimates the processing time at which the defective food is processed by the processing apparatus 20 based on the time at which the defective food is inspected. The storage unit 62 stores the processing information of the processing apparatus 20 related to the processing time estimated by the control unit 61 such that the processing information can be output. Therefore, the operator can confirm the processing information by outputting the processing information stored in the storage unit. As a result, the operator can easily identify the cause of the production of the defective food caused by the processing of the processing apparatus based on the processing information.

In the present embodiment, the control unit 61 estimates the processing time based on the food processing speed at which the food is processed per unit time in the production line 2. As a result, the accuracy of the processing time estimated by the control unit 61 can be improved.

Furthermore, the control unit 61 selects image information in a time zone including the processing time from the image information indicating the processing status captured by the camera 70. The storage unit 62 stores the selected image information as the processing information. The operator can confirm the image including the processing time by outputting the selected image. This eliminates the need for the operator to search for image information in which the defective food is processed from image information obtained by capturing an image of the food processing status, thereby reducing the time for identifying the cause of the production of the defective food due to the processing of the processing apparatus 20.

In addition, the storage unit 62 stores each piece of image information selected from each piece of image information captured by the plurality of cameras 70 as processing information. This eliminates the need for the operator to search for image information in which the defective food is processed in each processing from a plurality of pieces of image information captured by the plurality of cameras 70, thereby further reducing the time for identifying the cause of the production of the defective food due to the processing of the processing apparatus 20.

In the embodiment, the control unit 61 estimates the processing time at which the defective food is processed by the weighing apparatus 22. Since an individual identification number cannot be assigned to the food before packaging, it is particularly difficult to identify the cause of the production of the defective food due to the processing of the weighing apparatus 22. However, since the processing time of the weighing apparatus 22 is estimated by the control unit 61, the operator can easily identify the cause of the production of the defective food due to the processing of the weighing apparatus 22.

Other Embodiments

Although the embodiments have been described above, it should not be understood that the descriptions and drawings constituting a part of this disclosure limit the present invention. Various alternative embodiments, examples, and operation techniques will be apparent to those skilled in the art from this disclosure.

For example, the camera 70 may include a camera that captures an image of packaging processing status of the packaging apparatus 23.

What is claimed is:

1. A management system that manages a production line including a processing apparatus that performs a processing on food, a weighing apparatus that measures food and a packaging apparatus that packages the measured food using a bag and an inspection apparatus that determines a package which is the food packaged using the bag by the processing apparatus is defective, the management system comprising:
   a processor; and
   a memory that stores in association an image of the food during the processing and image time information that indicates a time at which the image is captured,
   wherein the processor:
      estimates a processing time at which the processing apparatus performs the processing on the food based on an inspection time at which the inspection apparatus determines that the package is defective and a food processing speed per unit time of the production line, selects from the memory the image associated with the image time information that corresponds to the processing time, and
outputs the image.

2. The management system according to claim 1, further comprising a camera which captures an image of a processing status in which the food is processed by the processing apparatus, wherein
the processor selects image information in a time zone including the processing time from image information indicating the processing status captured by the camera, and
the memory stores the selected image information as the processing information.

3. The management system according to claim 2, wherein
the processing apparatus performs a first processing on the food and performs a second processing on the food after the first processing,
the camera includes:
a first camera that captures an image of a processing status of the food in the first processing; and
a second camera that captures an image of a processing status of the food in the second processing,
the processor:
estimates a first processing time at which the defective food is processed by the first processing and a second processing time at which the defective food is processed by the second processing based on the time at which the inspection is performed;
selects image information in a first time zone including the first processing time from image information indicating the processing status captured by the first camera; and
selects image information in a second time zone including the second processing time from image information indicating the processing status captured by the second camera; and
the memory stores each piece of the selected image information as the processing information.

4. The management system according to claim 1, wherein
the processing apparatus includes:
a weighing apparatus that weighs the food; and
the packaging apparatus, and
the processor estimates the processing time at which the defective food is processed by the weighing apparatus.

* * * * *